United States Patent [19]

Sakashita et al.

[11] Patent Number: 5,053,281

[45] Date of Patent: Oct. 1, 1991

[54] AROMATIC POLYAMIDE AND GAS-BARRIER PROPERTY IMPARTING AGENT COMPOSED OF IT

[75] Inventors: Takeshi Sakashita, Iwakuni; Tomoaki Shimoda, Yamaguchi, both of Japan

[73] Assignee: Mitsui Petrochemical Industries, Ltd., Tokyo, Japan

[21] Appl. No.: 544,635

[22] Filed: Jun. 27, 1990

Related U.S. Application Data

[62] Division of Ser. No. 183,741, Apr. 8, 1988, abandoned.

[30] Foreign Application Priority Data

Aug. 20, 1986 [JP] Japan .................................. 61-192938

[51] Int. Cl.$^5$ ...................... B32B 27/08; B32B 27/32; B32B 27/34; B32B 27/36
[52] U.S. Cl. ................................ 428/412; 428/474.4; 428/475.2; 428/476.9
[58] Field of Search ................... 428/474.4, 412, 475.2, 428/476.9; 528/338, 339, 340, 346, 347, 349, 348

[56] References Cited

U.S. PATENT DOCUMENTS

| | | | |
|---|---|---|---|
| 3,475,387 | 10/1969 | Carter et al. | 528/338 |
| 3,597,400 | 8/1971 | Kashiro et al. | 528/338 |
| 3,627,736 | 12/1971 | Raum et al. | 528/338 |
| 4,207,411 | 6/1980 | Shue | 528/338 |
| 4,219,636 | 8/1980 | Nielinger | 528/340 X |
| 4,264,762 | 4/1981 | Cordes et al. | 528/340 X |

*Primary Examiner*—Thomas J. Herbert, Jr.
*Attorney, Agent, or Firm*—Sherman and Shalloway

[57] ABSTRACT

This invention provides an aromatic polyamide having excellent gas-barrier property as well as excellent melt-moldability, thermal stability, mechanical strength and transparency. Because of its excellent gas-barrier property, this aromatic polyamide can be used, for example, as a material for containers, and protects articles held in the containers from gases.

3 Claims, No Drawings

AROMATIC POLYAMIDE AND GAS-BARRIER PROPERTY IMPARTING AGENT COMPOSED OF IT

This is a division of application Ser. No. 07/183,741, filed Apr. 8, 1988, now abandoned.

TECHNOLOGICAL FIELD

This invention relates to an aromatic polyamide, and a gas-barrier property imparting agent based on the excellent gas barrier property of the aromatic polyamide. More specifically, this invention relates to an aromatic polyamide having excellent melt-moldability, thermal stability, mechanical strength, transparency and gas-barrier property which are the properties suitable for use as a material for containers, and to a gas-barrier property imparting agent composed of the polyamide.

BACKGROUND TECHNOLOGY

Glass has widely been used heretofore as a material for containers holding seasonings, oils, beer, wines and liquors such as sake, cooling drinks such as carbonated drinks, cosmetics, and detergents. Glass containers have excellent gas-barrier property, but since the cost of their production is high, empty bottles after use are recovered and recycled for further use. The glass containers have the defect that they are heavy and require large transportation expenses, and are also fragile and incovenient to handle.

To eliminate the aforesaid defects of the glass containers, various plastic containers have increasingly replaced the glass containers. Various plastics have been employed as materials for the plastic containers depending upon the type and the purpose of use of an article to be held. Among these plastic materials, polyethylene terephthalate has especially superior gas-barrier property and transparency, and has therefore been used as a material for containers which hold seasonings, cooling drinks, detergents and cosmetics. For containers holding beer and carbonated drinks which require most rigorous gas-barrier property among them, polyethylene terephthalate has not yet proved to be entirely satisfactory. When polyethylene terephthalate is to be used in the containers, their gas-barrier property should be increased by increasing the wall thickness of the containers.

Aliphatic polyamides such as nylon 6 and nylon 66 show better gas-barrier property than polyethylene terephthalate in the dry state, but since these polymers generally have a water absorption of about 10% and in the water-absorbed state, they have lower gas-barrier property than polyethylene terephthalate. Crystalline polyamides containing a cyclic hydrocarbon group are disclosed in Japanese Laid-Open Patent Publication No. 195126/1985 in an attempt to remedy this water absorbability defect of the crystalline polyamides. These polyamides, however, have the defect of being inferior in transparency because they are crystalline.

It is an object of this invention to provide a novel aromatic polyamide.

Another object of this invention is to provide a novel aromatic polyamide which has excellent gas-barrier property with respect to gases such as oxygen and carbon dioxide gas and excellent transparency and are superior in chemical and physical properties such as thermal properties, mechanical properties, chemical resistance and water resistance.

Still another object of this invention is to provide a gas-barrier property imparting agent composed of the aforesaid aromatic polyamide by utilizing the excellent gas-barrier property of the aromatic polyamide.

DISCLOSURE OF THE INVENTION

According to this invention, the above objects of this invention along with its advantages are achieved by an aromatic polyamide characterized in that (1) it is composed of a random arrangement of isophthaloyldiamine component recurring units represented by the following formula (I)

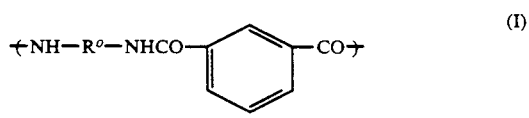

(I)

wherein $R^o$ is a divalent hydrocarbon group having 4 to 25 carbon atoms,
and diacyloyldiamine component recurring units represented by the following formula (II)

$$NH-R^o-NHCO-Ar-CO \qquad (II)$$

wherein $R^o$ is as defined above, and Ar is a divalent aromatic hydrocarbon group containing 6 to 20 carbon atoms other than the 1,3-phenylene group, (2) it has such a composition that based on the entire recurring units, the proportion of the isophthaloyldiamine component units is 50 to 100 mole % and the proportion of the diacyloyldiamine component units is 50 to 0 mole %, (3) it has a melt flow rate (MFR), measured at 300° C. under a load of 2 kg, of 0.01 to 100 g/10 min., (4) it has a crystallinity, measured by X-ray diffractometry, of not more than 7%, and (5) it has a glass transition temperature (Tg) of 110° to 240° C.

The recurring units constituting the aromatic polyamide of this invention are the isophthaloyldiamine component units of formula (I) and the diacyloyldiamine component units of formula (II).

In formula (I), $R^o$ is a divalent hydrocarbon group having 4 to 25 carbon atoms, such as divalent aliphatic hydrocarbon groups having 4 to 25 carbon atoms, divalent alicyclic hydrocarbon groups having 6 to 25 carbon atoms and containing at least one alicyclic hydrocarbon ring, and divalent aromatic hydrocarbon groups having 6 to 25 carbon atoms and containing at least one aromatic hydrocarbon ring.

Preferred as $R^o$ are mixtures of divalent aliphatic hydrocarbon groups having 4 to 25 carbon atoms and divalent alicyclic hydrocarbon groups having 6 to 25 carbon atoms and containing at least one alicyclic hydrocarbon ring, and mixtures of divalent aliphatic hydrocarbon groups having 4 to 25 carbon atoms and divalent aromatic hydrocarbon groups having 6 to 25 carbon atoms and containing at least one aromatic hydrocarbon ring.

Above all, a mixture of 5 to 98 mole %, especially 40 to 85 mole %, of such a divalent aliphatic hydrocarbon group and 95 to 2 mole %, especially 60 to 15 mole %, or a mixture of 5 to 98 mole %, especially 40 to 85 mole %, of the divalent aliphatic hydrocarbon group and 95 to 2 moles, especially 60 to 15 mole %, of such a divalent aromatic hydrocarbon groups is preferred.

The divalent hydrocarbon residue $R^o$ in formula (I) is derived from a diamine of the formula $NH_2-R^o-NH_2$.

Diamines in which $R^o$ is a divalent aliphatic hydrocarbon group having 4 to 25 carbon atoms may be, for example, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane and 1,20-diaminoeicosane. These alkylenediamines may be used singly or in combination. Among these alkylene diamines, those having 6 to 16 carbon atoms are preferred, and 1,6-diaminohexane is especially preferred.

Examples of diamines in which $R^o$ is a divalent alicyclic hydrocarbon group containing at least one alicyclic hydrocarbon ring and having 6 to 25 carbon atoms include 1,3-diaminocyclohexane, 1,4-diaminocyclohexane, 1,3-bis(aminomethyl)cyclohexane, 1,4-bis(aminomethyl)cyclohexane, isophoronediamine, piperazine, 2,5-dimethylpiperazine, bis(4-aminocyclohexyl)methane, bis(4-aminocyclohexyl)propane, 4,4'-diamino-3,3'-dimethyldicyclohexylmethane, 4,4'-diamino-3,3'-dimethyldicyclohexyl-propane, 4,4'-diamino-3,3',5,5'-tetramethyl-dicyclohexylmethane, 4,4'-diamino-3,3',5,5'-tetramethyl-dicyclohexylpropane, 4,4'-diamino-3,3'-dimethyldicyclohexane, 4,4'-diamino-3,3',5,5'-tetramethyldicyclohexane, alpha,alpha'-bis(4-amionocyclohexyl)-p-diisopropylbenzene, alpha,alpha'-bis(4-aminocyclohexyl)-m-diisopropylbenzene, alpha,alpha'-bis(4-aminocyclohexyl-1,4-cyclohexane, and alpha,alpha'-bis(4-aminocyclohexyl)1,3-cyclohexane.

Examples of diamines in which $R^o$ represents a divalent aromatic hydrocarbon group having 6 to 25 carbon atoms and containing at least one aromatic hydrocarbon ring include p-phenylenediamine, m-phenylenediamine, p-xylylenediamine, m-xylylenediamine, 4,4'-diaminodiphenylmethane, 4,4'-diaminodiphenylether, 4,4'-diaminodiphenylpropane, 4,4'-diaminodiphenylsulfone, 4,4'-diaminodiphenyl sulfide, alpha,alpha'-bis(4-aminophenyl)-p-isopropylbenzene and alpha,alpha'-bis(4-aminophenyl)-m-isopropylbenzene. Among these diamines, the alicyclic diamines and aromatic diamines are preferred. Of the alicyclic diamines, bis(4-aminocyclohexyl)metane, 4,4'-diamino-3,3'-dimethyldicyclohexylmethane and 1,3-bis(aminomethyl)cyclohexane are especially preferred, and m-xylylenediamine, p-xylylenediamine and 4,4'-diaminodiphenylmethane are especially preferred among the aromatic diamines.

In formula (II), $R^o$ is as defined with regard to formula (I), and Ar is a divalent aromatic hydrocarbon group having 6 to 20 carbon atoms other than the 1,3-phenylene group.

The divalent aromatic hydrocarbon group Ar in formula (II) is derived from an aromatic dicarboxylic acid represented by the formula HOCO—Ar—COOH or its functional derivative.

Examples of the aromatic dicarboxylic acid are terephthalic acid, phthalic acid, 2,6-naphthalenedicarboxylic acid, 2,5-naphthalenedicarboxylic acid, 1,4-naphthalenedicarboxylic acid and 1,5-naphthalenedicarboxylic acid.

The recurring units of the aromatic polyamide of this invention consists of the isophthaloyldiamine component units of formula (I), or both the isophthaloyldiamine component units of formula (I) and the diacyloyldiamine component units of formula (II). In either case, where the polyamide contains a plurality of dissimilar recurring units, they are distributed or arranged at random in the polymer chain.

The aromatic polyamide of this invention can be produced, for example, by polycondensing a halide of a corresponding aromatic dicarboxylic acid (isophthalic acid or both isophthalic acid and an aromatic dicarboxylic acid of the formula HOOC—Ar—COOH) and a diamine of the formula $NH_2-R^o-NH_2$ by the solution method or the interfacial method.

It may also be produced by polycondensing a nylon salt of a corresponding aromatic dicarboxylic acid and a corresponding diamine or a prepolymer, such as an oligomer, between them by using a kneading means under shearing conditions in the heat-melted state. Among these, the third method is suitable as an industrial method. By any of these methods, a polyamide composed of 50 to 100 mole % of the isophthaloyldiamine component units and 0 to 50 mole % of the diacyloyldiamine component units can be produced by adjusting the composition of the starting aromatic dicarboxylic acid component and the composition of the starting diamine component.

The molecular chain of the aromatic polyamide of this invention may be formed in a linear, branched or crosslinked structure. The branched or crosslinked structure may be formed by using a trifunctional or higher polycarboxylic acid or polyamine in the above polycondensation step. Desirably, the aromatic polyamide of this invention is linear or branched, and more desirably, is of such a structure that dissolves in concentrated sulfuric acid at 30° C.

The molecular terminal of the aromatic polyamide component may be a diamine component, an isophthalic acid component or an aromatic dicarboxylic acid component other than the isophthalic acid component. Where the molecular terminal is the alkylenediamine component, the terminal amino group may be acylated with a lower carboxylic acid or may form a salt with an acid. Where the molecular terminal is a terephthalic acid component, an isophthalic acid component or a carboxyphthalic acid component, the terminal carboxyl group may be esterified with a lower alcohol, or may be amidated with an amine, or may form a salt with an acid, or may form an acid anhydride with another carboxylic acid.

The aromatic polyamide of this invention is composed of 50 to 100 mole % of the isophthalyldiamine component units and 50 to 0 mole % of the diacyloyldiamine component units, based on the entire recurring units. The proportion of the isophthaloyldiamine component units is preferably 60 to 90 mole %, more preferably 65 to 80 mole %, and the proportion of the diacyloyldiamine component units is preferably 40 to 10 mole %, more preferably 35 to 20 mole %.

The aromatic polyamide of this invention has a melt flow rate (MFR), measured at 300° C. under a load of 2 kg, of 0.01 to 100 g/10 min., preferably 0.1 to 50 g/10 min., more preferably 0.5 to 30 g/10 min.

The aromatic polyamide of this invention has a crystallinity, measured by X-ray diffractometry, of not more than 7%, preferably not more than 5%, more preferably not more than 3%.

Furthermore, the aromatic polyamide of this invention has a glass transition temperature (Tg, °C.) of 110° to 240° C., preferably 120° to 220° C., more preferably 130° C. to 200° C. The glass transition temperature is measured by a differential scanning calorimeter at a temperature elevation rate of 10 °C./min.

The intrinsic viscosity [ξ], measured in concentrated sulfuric acid at 30° C., of the aromatic polyamide of this invention is preferably 0.4 to 2.0 dl/g, more preferably 0.5 to 1.3 dl/g. Its crystalline melting point (Tm, °C.) measured under the same measuring conditions as in the measurement of the glass transition temperature is preferably 220° to 350° C., more preferably 240° to 320° C.

The aromatic polyamide of this invention shows excellent gas-barrier property with respect to gases such as oxygen and carbon dioxide. Accordingly, the present invention likewise provides a gas-barrier property imparting agent composed of the aromatic polyamide of this invention by utilizing the excellent gas-barrier property of the aromatic polyamide.

The aromatic polyamide of this invention as the gas-barrier property imparting agent of this invention is used as a packaging material in the form of a blend with another resin, for example polyethylene terephthalate, polycarbonate or an olefin, or in the form of a laminated structure with the other resin.

In the case of using the polyamide of this invention as a blend, the proportion of the polyamide is usually in the range of 3 to 200 parts by weight, preferably 5 to 180 parts by weight, especially preferably 5 to 150 parts by weight, per 100 parts by weight of the other resin.

The laminated structure is produced by, for example, multilayer simultaneous extrusion and may be in any desired layer construction, for example, A/B or B/A/B in which A represents the polyamide of this invention and B represents the other resin. The suitable thickness of the polyamide is at least 2 microns, preferably at least 3 microns, especially at least 5 microns.

The following examples will now illustrate the present invention specifically.

The abbreviations used in the following table show the following compounds.
TA: terephthalic acid
IA: isophthalic acid
C$_6$DA: 1,6-diaminohexane
ACM: bis(4-aminocyclohexyl)methane
DMACM: 4,4''-diamino-3,3''-dimethylcyclohexylmethane
AMC: 1,3-bis(aminomethyl)cyclohexane
MXD m-xylylenediamine The composition, melting point, intrinsic viscosity [ξ], MFR and a crystallinity of the polyamide were determined by the following methods.

(1) Composition of the polyamide

Calculated in accordance with $^{13}$C—NMR in hexafluoroisopropanol solvent and elemental analysis values of the polyamide and a polyamide prepolymer as a material for the polyamide.

(2) Glass transition temperature

Determined by performing differential thermal analysis of the resin at a temperature elevating speed of 10° C. per minute by using a differential scanning calorimeter (Model DSC-2 made by Perkin Elmer Company).

(3) Intrinsic viscosity [ξ]

The relative viscosities of three 96% by weight concentrated sulfuric acid solutions of the resin in a resin concentration of 0.500 g/dl, 0.770 g/dl, and 1.00 g/dl are measured by an Ubbelohde's viscometer, and their specific viscosities are calculated. From these points of the specific viscosities, [ξ] is determined by construction. The above solution was prepared at 30° C.

(4) MFR

Measured at 300° C. under a load of 2 kg in accordance with the method of JIS K-7210.

(5) Crystallinity

Determined by broad angle (2θ: 70°–3°) X-ray diffraction of a press sheet sample using Rotaflex RL1-200A made by Rigaku Denki K. K.

The gas-barrier property in the Examples and Comparative Examples was evaluated by oxygen gas permeability coefficient and carbon dioxide permeability coefficient measured respectively at 25° C. by using an OX-TRAN device made by Mocon Company and a PERMETRAN C-IV device made by Mocon Company.

EXAMPLE 1

Terephthalic acid (89.22 g; 0.537 M), 208.17 g (1.253 M) of isophthalic acid, 193.54 g (0.92 M) of bis(4-aminocyclohexyl)methane and 106.91 g (0.92 M) of 1,6-diaminohexane were charged into a 1-liter autoclave together with 68 g of deionized water and 0.38 g (0.00358 M) of sodium diphosphite, and after thorough purging with N$_2$, the temperature was raised to 250° C. over the course of 3 hours with stirring. The reaction was carried out at 250° C. for 1 hour while the autoclave was closed. The stirring was then stopped, and the reaction mixture was withdrawn from the bottom portion of the autoclave under a differential pressure of 10 kg/cm$^2$. It was dried overnight in N$_2$ at 50° C. and 100 mmHg to give a prepolymer. The prepolymer had an [ξ] (at 30° C. in conc. H$_2$SO$_4$) of 0.12 dl/g. The prepolymer was further polycondensed in the molten state by a twin-screw extruder (screw diameter 30 mm; L/D=42; barrel temperatures (°C.) 80/180/340/340/280/280/260/260; the third, fourth and fifth zones had vents open to the atmosphere; rotating speed 50 rpm; the amount of the prepolymer fed 2 kg/hr; evacuation by N$_2$ purging) to give a colorless transparent polymer. The proportion (mole %) of the isophthalic acid component units in the polymer, the proportion (mole %) of the terephthalic acid component units in the polymer and the MFR (g/10 min.), [ξ] (at 30° C. in conc. H$_2$SO$_4$) and glass transition temperature of the polymer are shown in Table 1.

EXAMPLE 2–4

The polymers shown in Table 1 were prepared by the same method as described in Example 1 except that the type or amount of the diamine component was changed.

EXAMPLE 5

The polymer shown in Table 1 was obtained in the same way as in Example 1 except that 89.22 g (0.537 M) of terephthalic acid, 208.17 g (1.253 M) of isophthalic acid, 106.91 g (0.92 M) of 1,6-diaminohexane, 125.12 g (0.92 M) of m-xylylenediamine, 75 g of deionized water and 0.38 g (0.00358 M) of sodium diphosphite were used as starting materials.

EXAMPLE 6

The polymer indicated in Table 1 was obtained by the same method as described in Example 5 except that all terephthalic acid in Example 5 was replaced by isophthalic acid.

melted to form a bottom portion. The other end was likewise heat-melted to form a faucet portion. Thus, a

TABLE 1

|  | Example 1 | Example 2 | Example 3 | Example 4 | Example 5 | Example 6 |
| --- | --- | --- | --- | --- | --- | --- |
| Materials |  |  |  |  |  |  |
| Acid component (type) | TA/IA | TA/IA | TA/IA | TA/IA | TA/IA | IA |
| Amount of the acid component (mole ratio) | 30/70 | 30/70 | 30/70 | 30/70 | 30/70 | 100 |
| Diamine component (type) | $C_6DA$/ACM | $C_6DA$/ACM | $C_6DA$/DMACM | $C_6DA$/AMC | $C_6DA$/MXD | $C_6DA$/MXD |
| Amount of the diamine component (mole ratio) | 50/50 | 75/25 | 75/25 | 75/25 | 50/50 | 50/50 |
| Polymer |  |  |  |  |  |  |
| Acid component (type) | TA/IA | TA/IA | TA/IA | TA/IA | TA/IA | IA |
| Amount of the acid component (mole ratio) | 30/70 | 30/70 | 30/70 | 30/70 | 30/70 | 100 |
| Diamine component (type) | $C_6DA$/ACM | $C_6DA$/ACM | $C_6DA$/DMACM | $C_6DA$/AMC | $C_6DA$/MXD | $C_6DA$/MXD |
| Amount of the diamine component (mole ratio) | 49/51 | 74/26 | 74/26 | 75/25 | 49/51 | 50/50 |
| MFR (g/10 min., 300° C., 2 kg) | 2.1 | 12.3 | 18.4 | 15.6 | 13.7 | 7.2 |
| $[\eta]$ (dl/g, at 30° C. in conc. $H_2SO_4$) | 0.64 | 0.71 | 0.68 | 0.70 | 0.81 | 0.96 |
| Glass transition temperature (°C.) | 189 | 160 | 154 | 150 | 157 | 154 |
| Crystallinity (%) | 0 | 0 | 0 | 0 | 0 | 0 |

Note: The mole ratio of the acid component to the diamine component charged was 1.00:1.03.

EXAMPLE 7

The polyamide pellets obtained in Example 1 were dried at 100° C. under 1 mmHg for 12 hours, and then hot-pressed at a temperature 120° C. higher than the Tg of the polymer under a pressure of 100 kg/cm² in a nitrogen atmosphere in a press-molding machine, then cold-pressed at a temperature of 20° C. to obtain a transparent press sheet having a thickness of 100 microns. The press sheet was cut to a predetermined size, and dried in an atmosphere of nitrogen at 100° C. under 40 mmHg for 12 hours. The gas-barrier property of the cut press sheet was measured. The results are shown in Table 2.

EXAMPLES 8 to 12

In each run, a press sheet was prepared by the same method as in Example 7 except that each of the polymers obtained in Examples 2 to 6 as shown in Table 1 were used. The results are shown in Table 2.

preform having a total length of 16.5 cm and a weight of 50 g was obtained. Then, by using a biaxial-stretch blow-molding machine (LB01 made by Corpoplast Company), the preform was biaxially stretched at a stretch ratio of 2.5 in the longitudinal direction and 4 in the transverse direction to obtain a multilayered container (polyethylene terephthalate/polyamide/polyethylene terephthalate = about 120 microns/about 120 microns/about 120 microns) having an inner capacity of 1.5 liters. The gas-barrier property of this multilayered container was measured and the results are shown in Table 3.

EXAMPLES 14 to 16

A multilayered container was produced by the method described in Example 13 except that each of the polymers obtained in Examples 2 to 4 as shown in Table 1 was used instead of the polyamide produced in Example 1. The results are shown in Table 3.

TABLE 2

|  | Example 7 | Example 8 | Example 9 | Example 10 | Example 11 | Example 12 |
| --- | --- | --- | --- | --- | --- | --- |
| Examples of polyamide production | Example 1 | Example 2 | Example 3 | Example 4 | Example 5 | Example 6 |
| Gas-barrier property |  |  |  |  |  |  |
| Oxygen permeability coefficient (ml.mm/m².day.atm) | 0.7 | 1.8 | 1.9 | 2.1 | 1.5 | 1.1 |
| Carbon dioxide permeability coefficient (ml.mm/m².day.atm) | 3.9 | 6.5 | 6.9 | 7.3 | 3.9 | 3.2 |

EXAMPLE 13

Polyethylene terephthalate (Mitsui PET J125, a product of Mitsui PET Resin Co., Ltd.) was melted by using one extruder. Separately, the polyamide of Example 1 was melted by using another extruder. The molten polymers were respectively fed into a two-kind three-layer pipe die, and a three-layer pipe composed of polyethylene terephthalate/polyamide/polyethylene terephthalate (thickness about 1.2 mm/1.2 mm/1.2 mm). The pipe was cooled with water to obtain a three-layer pipe having an outside diameter of 24.8 mm and a thickness of 3.0 mm. The pipe was then cut and one end was heat-

COMPARATIVE EXAMPLE 1

A container was produced by the same method as in Example 13 except that only polyethylene terephthalate (Mitsui PET J125, made by Mitsui PET Resin Co., Ltd.) was used. The gas-barrier property of the container was measured.

COMPARATIVE EXAMPLE 2

A polyamide was synthesized by the method described in Example 1 except that 208.17 g (1.253 M) of terephthalic acid, 89.22 g (0.537 M) of isophthalic acid and 213.83 g (1.84 M) of 1,6-diaminohexane were used.

The resulting polymer was a white crystalline polyamide having a melting point of 310° C., an [ξ] of 1.2 dl/g and a crystallinity of 25%.

A three-layer container was produced by the same method as in Example 13 using the polyamide and polyethylene terephthalate, and its gas-barrier property was measured.

TABLE 3

|  | Example 13 | Example 14 | Example 15 | Example 16 | Comparative Example 1 | Comparative Example 2 |
|---|---|---|---|---|---|---|
| Examples of polyamide production | Example 1 | Example 2 | Example 3 | Example 4 | — | — |
| Gas-barrier property |  |  |  |  |  |  |
| Oxygen permeability coefficient (ml.mm/m².day.atm) | 1.1 | 2.7 | 2.9 | 3.5 | 4.6 | 3.8 |
| Carbon dioxide permeability coefficient (ml.mm/m².day.atm) | 5.9 | 9.8 | 11.0 | 11.7 | 25.0 | 12.8 |

We claim:

1. A gas-barrier material comprising a laminated structure of at least one layer of an aromatic polyamide as a gas-barrier layer, said aromatic polyamide
composed of a random arrangement of isophthaloyldiamine component recurring units represented by the formula (I)

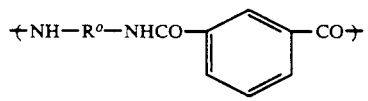
(I)

where $R^o$ is a divalent hydrocarbon group having 4 to 25 carbon atoms, and diacyloyldiamine component recurring units represented by the formula (II)

$$NH-R^o-NHCO-Ar-CO \quad (II)$$

wherein $R^o$ is as defined above, and Ar is a divalent aromatic hydrocarbon residue containing 6 to 20 carbon atoms other than the 1,3-phenylene group,
having a composition such that, based on the entire recurring units, the proportion of the isophthaloyldiamine component units is 50 to 100 mole % and the proportion of the diacyloyldiamine component units is 50 to 0 mole %,
having a melt flow rate (MFR), measured at 300° C. under a load of 2 kg, of 0.01 to 100 g/10 min.,
having crystallinity, measured by X-ray diffractometry, of not more than 7%,
having a glass transition temperature (Tg) of 110 to 240° C.,
having an oxygen permeability coefficient, measured on a sheet having a thickness of 100 microns, at 25° C., of 0.7 to 2.1 ml.mm/m².day.atm, and
having a carbon dioxide permeability coefficient, measured on a sheet having a thickness of 100 microns, at 25° C., of 3.2 to 7.3 ml.mm/m².day.atm; and
at least one layer of polyethylene terephthalate, polycarbonate or polyolefin.

2. The gas-barrier material according to claim 1, wherein said laminated structure comprises one middle layer of said aromatic polyamide and two outer layers of a resin other than said aromatic polyamide.

3. A gas-barrier material comprising a blend of an aromatic polyamide as a gas-barrier imparting agent, said aromatic polyamide
composed of a random arrangement of isophthaloyldiamine component recurring units represented by the formula (I)

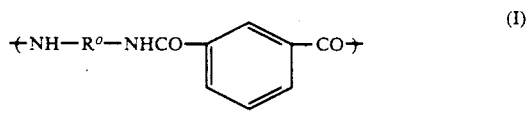
(I)

wherein $R^o$ is a divalent hydrocarbon group having 4 to 25 carbon atoms, and diacyloyldiamine component recurring units represented by the formula (II)

$$NH-R^o-NHCO-Ar-CO \quad (II)$$

wherein $R^{10}$ is as defined above, and Ar is a divalent aromatic hydrocarbon residue containing 6 to 20 carbon atoms other than the 1,3-phenylene group,
having a composition such that, based on the entire recurring units, the proportion of the isophthaloyldiamine component units is 50 to 100 mole % and the proportion of the diacyloyldiamine component units is 50 to 0 mole %,
having a melt flow rate (MFR), measured at 300° C. under a load of 2 kg, of 0.01 to 100 g/10 min.,
having crystallinity, measured by X-ray diffractometry, of not more than 7%,
having a glass transition temperature (Tg) of 110 to 240° C.,
having an oxygen permeability coefficient, measured on a sheet having a thickness of 100 microns, at 25° C., of 0.7 to 2.1 ml.mm/m².day.atm, and
having a carbon dioxide permeability coefficient, measured on a sheet having a thickness of 100 microns, at 25° C., of 3.2 to 7.3 ml.mm/m².day.atm; and polyethylene terephthalate, polycarbonate or polyolefin.

* * * * *